US010849042B2

(12) United States Patent
Singh et al.

(10) Patent No.: US 10,849,042 B2
(45) Date of Patent: Nov. 24, 2020

(54) CELL SELECTION TECHNIQUES FOR DIRECTIONAL COMMUNICATIONS

(71) Applicant: Apple Inc., Cupertino, CA (US)

(72) Inventors: Sarabjot Singh, Santa Clara (CA); Anum Ali, Austin, TX (US); Jing Zhu, Portland, OR (US); Nageen Himayat, Fremont, CA (US); Candy Yiu, Portland, OR (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/497,496

(22) PCT Filed: Apr. 28, 2017

(86) PCT No.: PCT/US2017/030194
§ 371 (c)(1),
(2) Date: Sep. 25, 2019

(87) PCT Pub. No.: WO2018/199991
PCT Pub. Date: Nov. 1, 2018

(65) Prior Publication Data
US 2020/0107239 A1 Apr. 2, 2020

(51) Int. Cl.
*H04W 36/30* (2009.01)
*H04B 7/06* (2006.01)
(Continued)

(52) U.S. Cl.
CPC .......... *H04W 36/30* (2013.01); *H04B 7/0695* (2013.01); *H04B 7/088* (2013.01); *H04W 36/0083* (2013.01); *H04W 36/06* (2013.01)

(58) Field of Classification Search
CPC ......... H04W 36/0058; H04W 36/0061; H04W 36/0066; H04W 48/02; H04W 48/08;
(Continued)

(56) References Cited

U.S. PATENT DOCUMENTS

| 6,697,415 B1 * | 2/2004 | Mahany | H04B 1/406 375/130 |
| 10,251,112 B2 * | 4/2019 | Fujishiro | H04W 48/12 |

(Continued)

FOREIGN PATENT DOCUMENTS

| EP | 1255369 A1 | 11/2002 |
| EP | 3206433 A1 | 8/2017 |

(Continued)

OTHER PUBLICATIONS

International Preliminary Report on Patentability dated Oct. 29, 2019 for International Application No. PCT/US2017/030194.

(Continued)

*Primary Examiner* — Jean A Gelin
(74) *Attorney, Agent, or Firm* — Eschweiler & Potashnik, LLC (57) ABSTRACT

An apparatus is configured to be employed within one or more nodes. The apparatus includes control circuitry. The control circuitry is configured to perform adaptive ranking to generate an alternative ranked set of beam pairs based on an adaptive ranking criteria, where the adaptive ranking criteria includes switching latencies and predicted qualities and select an alternative beam pair of the alternative ranked set of beam pairs.

16 Claims, 7 Drawing Sheets

(51) Int. Cl.
*H04B 7/08* (2006.01)
*H04W 36/00* (2009.01)
*H04W 36/06* (2009.01)

(58) Field of Classification Search
CPC ..... H04W 48/17; H04W 48/18; H04W 48/20; H04W 48/16; H04W 24/10; H04W 36/04; H04W 36/08
See application file for complete search history.

(56) References Cited

U.S. PATENT DOCUMENTS

| | | | |
|---|---|---|---|
| 2007/0038413 A1* | 2/2007 | Mehta | H04B 17/23 702/189 |
| 2011/0255514 A1* | 10/2011 | Olofsson | H04W 72/0426 370/331 |
| 2012/0052828 A1 | 3/2012 | Kamel et al. | |
| 2013/0121185 A1 | 5/2013 | Li et al. | |
| 2017/0094630 A1* | 3/2017 | Kim | H04W 60/06 |
| 2017/0311217 A1* | 10/2017 | Jung | H04W 36/04 |
| 2018/0213456 A1* | 7/2018 | Jheng | H04B 17/391 |

FOREIGN PATENT DOCUMENTS

| | | |
|---|---|---|
| WO | 2015/080645 A1 | 6/2015 |
| WO | 2016/003624 A1 | 1/2016 |
| WO | 2016/053426 A1 | 4/2016 |
| WO | 2016/065590 A1 | 5/2016 |
| WO | 2016/138655 A1 | 9/2016 |
| WO | 2017/196491 A1 | 11/2017 |

OTHER PUBLICATIONS

International Search Report dated Mar. 1, 2018 for International Application No. PCT/US2017/030194.

* cited by examiner

CELL SELECTION TECHNIQUES FOR DIRECTIONAL COMMUNICATIONS

This application is a National Phase entry application of International Patent Application No. PCT/US2017/030194 filed Apr. 28, 2017 and is hereby incorporated by reference in its entirety.

FIELD

The present disclosure relates to mobile communication and, more particularly to beam adaptation techniques for mobile communications.

BACKGROUND

Mobile communication, including cellular communication, involves the transfer of data between mobile devices. The use of mobile communication is continuously increasing. Additionally, the bandwidth or data rate used and needed for mobile communications is continuously increasing.

Some of the wavelengths used in mobile communication can be directional and/or sensitive to blocking. The blocking can be due to buildings, foliage, vehicle traffic, pedestrian traffic and the like. The blocking can make reliable communication challenging.

Techniques are needed to facilitate reliable communication with wavelengths that can be impacted by blocking.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC, an electronic circuit and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Some metrics for next generation (5G) wireless networks are related to cell formation, cell association and handover for millimeter-wave (mmWave) communication. Generally, cell formation pertains to grouping of transmit receive points (TRPs) to form a cell. Thus, multiple TRPs can comprise a cell. One associated metric is a rate based metric. Another metric is outage probability due to a blocker or blockage. The blocker is an object, such as a tree or vehicle, that blocks signals or beams from a cell to a node or device. Directional communications, such as mmWave communication, are susceptible to blockers and/or blockage.

The output probability is offered by each candidate cell. The outage probability can be derived from raw beam measurements. Additionally, proxy metrics for outage probability are provided. The proxy metrics are proportional to beam separation/correlation.

Various embodiments and/or techniques are provided that facilitate cell related activities including cell association, cell formation and cell handover. The techniques utilize additional metrics including, but not limited to, cell blockage probability.

Figure 1:
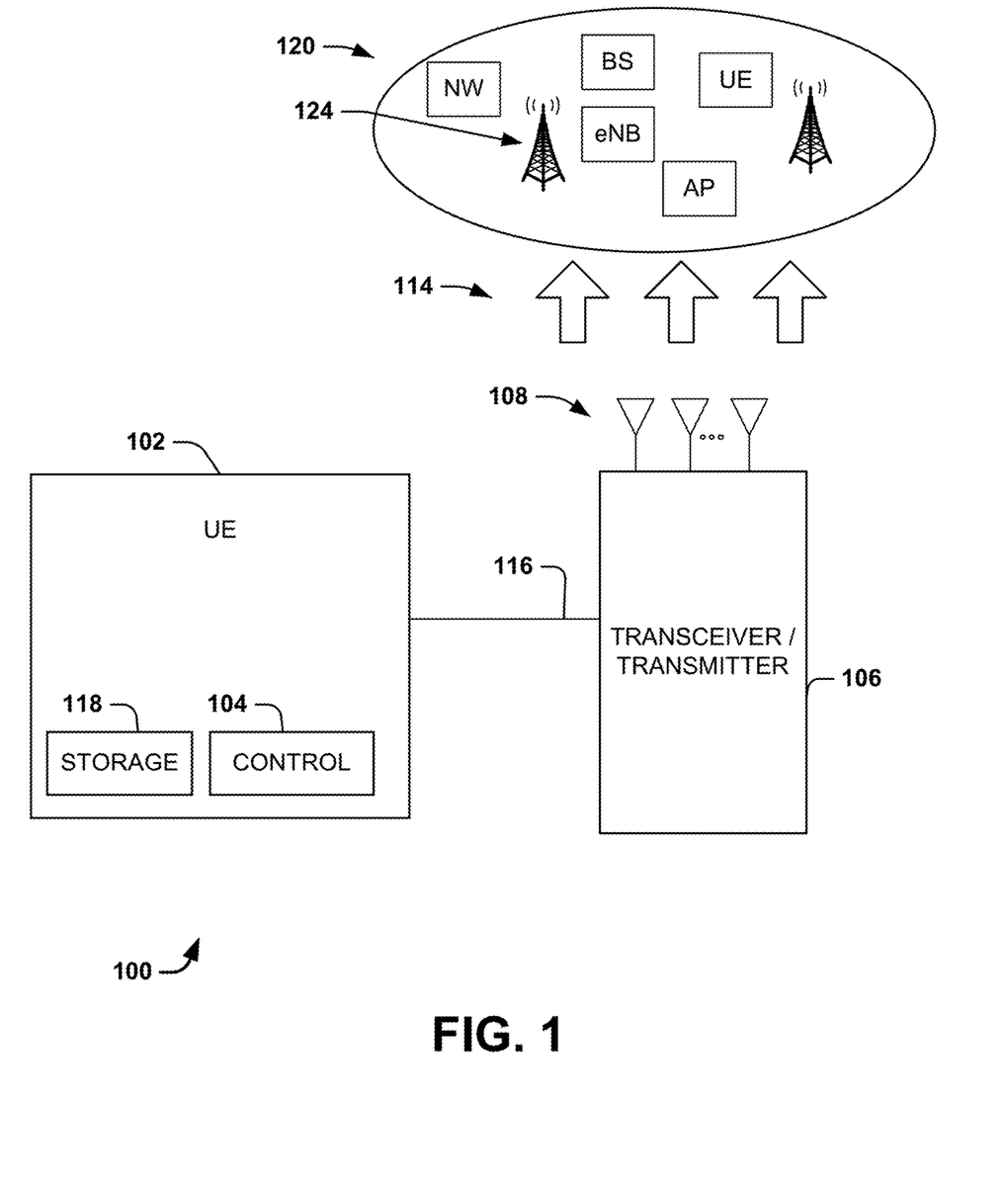
FIG. 1 is a diagram illustrating an arrangement for directional communications that facilitates cell related activities.

FIG. 1 is a diagram illustrating an arrangement 100 for directional mobile communications that facilitates cell related activities. The directional communications include millimetre-wave (mmWave) communications and the like. The cell related activities include cell association, cell formation and cell handover based on one or more metrics that include cell outage probability for candidate cells. The outage probability is associated with directional communications, such as millimetre-wave (mmWave) communications. The arrangement 100, can also be an apparatus, system and the like.

The arrangement 100 mitigates outage probability, enhances a data rate available from a chosen cell, enhances an average rate, mitigates outages given that an associated rate exceeds a threshold and enhances data rate given that an association outage is below a threshold.

The arrangement 100 includes a user equipment (UE) device 102, a transceiver 106, and nodes 120. The nodes 120 include components such as, but not limited to, a packet gateway (PGW), a secondary gateway (SGW), a mobility management entity (MME), a packet data network (PDN), UEs, evolved Node Bs (eNodeB) or (eNB), access points (AP), base stations (BS) and the like. The nodes 120 can also include network (NW) nodes. The term network node refers to a node operated by a network operator and may share information with other nodes, such as UE devices.

For illustrative purposes, a node 124 is shown as an eNodeB. However, it is appreciated that the node 124 can be one of the other types shown above.

The UE 102 includes the transceiver 106, a storage component 118, and control circuitry or controller 104. The storage component 118 includes a memory, storage element and the like and is configured to store information for the UE 102. The controller 104 is configured to perform various operations associated with the UE 102. The controller 104 can include logic, components, circuitry, one or more processors and the like. Further, the controller 104 can include and/or be part of baseband circuitry. The transceiver 106 includes transmitter functionality and receiver functionality. Further, the transceiver 106 is associated with RF circuitry. The UE 102 also includes one or more antenna 108 for communications with the network entities 120.

The eNodeB 124 includes a transceiver, a storage component, and control circuitry or controller. The storage component includes a memory, storage element and the like and is configured to store information for the eNodeB 124. The controller is configured to perform various operations associated with the eNodeB 124. The controller can include logic, components, circuitry, one or more processors and the like. The transceiver 106 includes transmitter functionality and receiver functionality. The eNodeB 124 can also include one or more antenna for communications with the nodes 120 and/or other UEs.

The UE 102 can be another type of node, such as the types of nodes described above including, but not limited to an eNodeB, BS, and the like.

The UE 102 is configured to perform and/or facilitate cell related activities including cell selection, cell handover and cell formation for directional communications, such as mmWave networks/communication. Cell formation describes grouping of one or more transmit receive points (TRPs) to form a cell. Thus, multiple TRPs can comprise a single cell. The cell related activities are performed and/or facilitated based on one or more metrics including a signal strength and additional metrics.

The rate based metric refers to a data rate for a cell or candidate cell. The term candidate cell refers to a cell to be formed, cell to be formed and/or a possible sell to be selected for cell handover and cell selection. The data rate can include peak rate, minimum rate, average rate and the like.

The outage probability metric refers to a probability of an outage for a cell or candidate cell. A cell outage can occur for a variety of reasons including software failures, hardware failures, radio units, antenna failures, power supply failures, network connectivity issues and the like. For mmWave communications, cells are also susceptible to blockages and/or interference from objects, referred to as blockers. The beam pairs used for mmWave communications are generally directional, thus objects that go between nodes can interfere with beam pairs of a cell and result in an outage. An outage can be when a quality value for a cell falls below a threshold value. The outage can be estimated or shown as a probability. Further, the outage probability can be expressed in terms of percentage within a period of time. Additionally, the outage probability can be expressed in terms of a gradient and/or gradual decline over a period of time.

The UE 102 is configured to obtain metric related measurements for one or more metrics. The one or more metrics can include a strength based metric, such as signal strength, and additional metrics. The additional metrics can include an outage probability metric and the like. The measurements cover a plurality of beam pairs associated with a plurality of TRPs and/or a plurality of candidate cells. In one example, the controller 104 is configured to obtain measurements from the transceiver 106 and store the measurements in the storage 118. For cell formation, the metric related measurements include measurements for beam pairs associated with a plurality of TRPs.

The UE 102 is configured to calculate one or more metrics based on the obtained measurements. In one example, the controller 104 is configured to calculate the one or more metrics based on the obtained measurements from the storage 118. Various techniques of calculating metrics are provided below.

In one example, an outage probability metric is based on the obtained metric related measurements. The outage probability metric can be at least partially based on heuristic proxy metrics, some examples of which are shown below.

The UE 102 is configured to select a candidate cell of a plurality of candidate cells based on the one or more calculated metrics. The selected candidate cell is also provided in a final decision, which includes the selected cell and can include additional information. The selected candidate cell is referred to as an alternative cell. In one example, controller 104 is configured to select the candidate cell.

The UE 102 can also be configured to form a cell based on the one or more calculated metrics. In this example, the cell can be formed from the calculated metrics based on metric measurements for a plurality of beam pairs and/or TRPs.

For illustrative purposes, the UE 102 is described and obtaining measurements, calculating metrics and performing cell selection. However it is appreciated that portions can be performed at the eNodeB 124 and/or other network nodes.

In one example, referred to as UE controlled, the UE 102 obtains the measurements, calculates the one or more metrics and makes the final decision. The UE 102 can inform a network and/or nodes about the final decision.

In another example, referred to as a hybrid approach, the UE 102 operates in conjunction with the network to make the final decision. Thus, the UE 102 performs and obtains the metric related measurements, calculates one or more metrics and informs the network about the one or more calculated metrics. The network makes the final decision and can inform the UE 102 about the final decision. In another variation, the network assists the UE 102 by configuring a mobility set. The mobility set identifies a set of TRPs that the UE 102 can autonomously connect to.

In yet another example, referred to as a network controlled approach, the UE 102 performs metric related measurements and provides the measurements to the network or network node(s). The network calculates the one or more metrics and makes the final decision. The network may inform the UE 102 about the final decision.

To determine an outage probability for a candidate cell, beam pairs used by the or possible cell are considered. Beam pairs are directional based and include a transmitter and receiver between a pair of nodes.

Beam pair models and key performance indicators (KPI) for cell related activities are described below. It is appreciated that suitable variations are contemplated.

A beam pair be denoted by (u,b) corresponding to a uth beam index at a UE/receiver and a bth at a network/transmitter side. T(b) denotes a mapping from a network beam index to TRP index and C(t) denotes a mapping of a TRP index (t) to a cell index in the scenario where a cell includes one or more TRPs.

The signal strength, such as reference signal received power (RSRP), on beam pair (u,b) is denoted by S(u,b). The outage threshold is denoted by γ, and thus the outage for beam pair (u,b) is defined as S(u,b)<γ.

An outage for a serving cell occurs when a beam pair (or multiple beam pairs) for a serving cell is blocked or interrupted and/or when there is a probability above a threshold for blockage of the beam pair.

It is assumed that upon encountering outage, a re-beamforming procedure is triggered where another beam pair within the serving cell is selected for the UE under consideration for communication. The re-beamforming is also referred to as a cell handover.

For the re-beamforming purposes, the set of candidate beam pairs available from the serving cell is denoted by B.

Several indicators, described as Key Performance Indicators (KPIs), can be determined to facilitate calculation of the one or more metrics.

One example of a KPI is Outage Probability. This metric captures or covers the chances of all the candidate beams from a serving cell to be in outage simultaneously, i.e. re-beamforming cannot alleviate outage. This could happen if all the candidate beams have high correlation e.g. neighboring beams. A lower value of outage probability enhances communication.

Mathematically outage probability O is defined as $$O = p(\cap_{(u,b) \in B} R(u,b) < \gamma)$$

Some heuristics proxy metrics for the outage probability are shown below. These metrics leverage that UE beam pairs that are further apart have lower blockage/outage correlation.

A max pairwise great circle distance (GCDmax) is a maximum great circle distance corresponding to steering angles among all possible UE beam pairs within a candidate set B of beam pairs.

An average great circle distance (GCDav) is the average great circle distance corresponding to steering angles among all possible UE beam pairs within the candidate set B of beam pairs.

A great circle distance (GCD) is a metric of computing a distance between any two points on sphere. For our application, the steering angles of a particular UE beam are projected on a unit sphere and the corresponding distance between any pair of beams calculated. The GCD between a beam P and a beam Q is used as a measure of the distance between the associated beams.

The outage probability or outage probability metric is inversely proportional to the above metrics, measurements and/or calculations. Thus, the inverse of the above metrics or any other metric capturing beam correlation can be calculated and used for cell related activities and/or the final decision.

In addition to the above, the outage probability metric(s) can also be determined using statistical and/or historical information about the environment in which the candidate cells operate.

In another example of determining outage probability metric(s), a number of beams exceed some signal threshold (e.g. reference signal received power (RSRP), reference signal received quality (RSRQ), received signal strength indicator (RSSI), signal to interference plus noise ratio (SINR) and the like) and an angular difference between the beams can be used to determine the outage probabilities. Generally, the closer the angular difference between a candidate beam and a current used beam is to 180 degree, the higher the chance the candidate beam can be used as a backup when blockage happens to the main/current beam. In this example, a number of available backup beams can be used to estimate the outage probability.

A rate metric can captures a possible or maximum possible throughput achievable from a candidate cell and is typically a monotonic function, f (say) of the corresponding beam RSRPs. A higher value facilitates communication.

Mathematically the rate metric is shown as $$R = f(\max_{u,b \in B} S(u,b))$$

In scenarios where a UE device is configured to select from multiple available cells, either of the above two metrics (or a combination) may be used as shown below.

The UE device can associate with a cell that leads to a lowest outage probability or any of its proxies. Mathematically, if c=1 . . . C denotes the set of available cells, the selected cell or the cell with the lowest outage probability is $$\arg\max_{c=1 \ldots C} Oc = P(\cap_{(u,b) \in cB} S(u,b) < \gamma)$$

where cB is a set of beam pairs for cell c, Oc is an outage probability measure for cell c.

The UE device can associate with the cell that leads to highest rate.

Mathematically the highest rate cell is $$\arg\max\nolimits_{c=1\ldots C} Rc = \max\nolimits_{u,b\in cB} S(u,b)$$

where Rc is the throughput offered by cell c

The UE can associate with a cell that leads to a highest rate given that the associated outage is sufficiently low, ie. Outage probability is below a threshold (th). Mathematically, the selected cell with is $$\arg\max\nolimits_{c=1\ldots C} Rc$$

$$Oc<th$$

where Oc is the outage probability of the cell c

The UE device can also associate with a cell that leads to lowest outage probability (or its proxies) given that the rate is sufficiently high, i.e. rate is above a threshold (th). Mathematically, the selected cell is $$\arg\min\nolimits_{c=1\ldots C} Oc$$

$$Rc>th,$$

where Rc is the rate of cell c.

In another example, the UE device can associate with the cell that leads to the highest average rate, i.e., $$\arg\max\nolimits_{c=1\ldots C} (1-Oc)Rc$$

Figure 2:
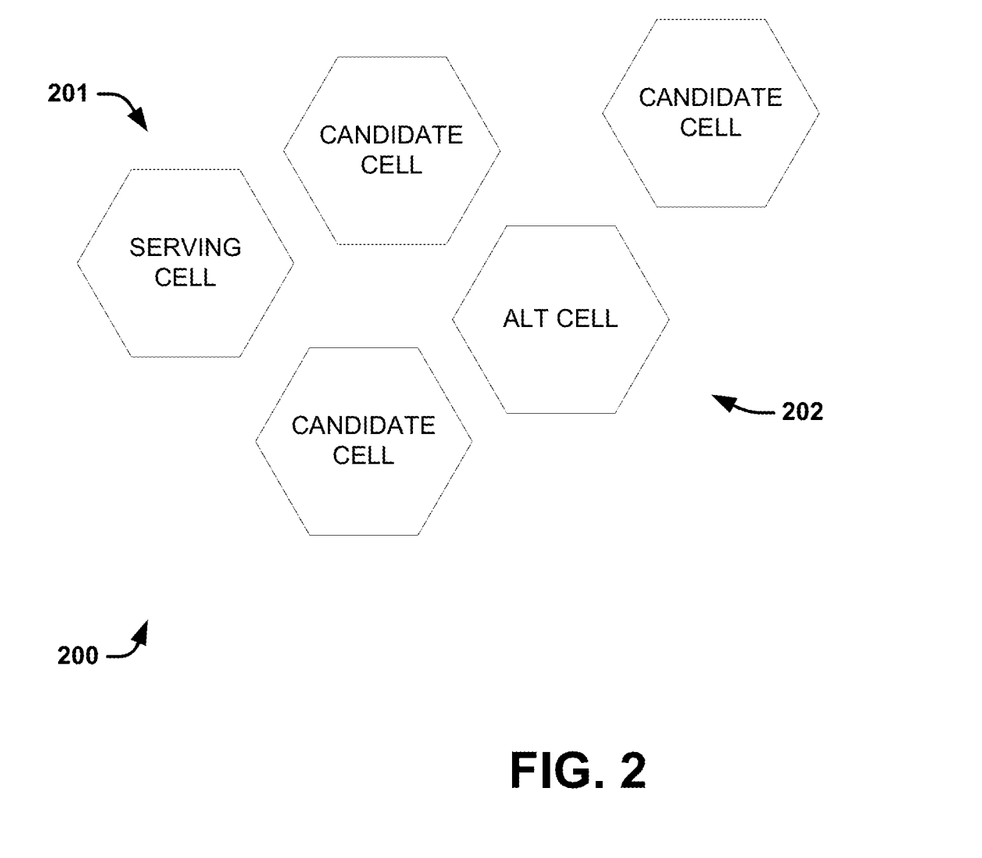
FIG. 2 is a diagram illustrating an example of cell handover for directional communication systems.

FIG. 2 is a diagram illustrating an example of cell handover for directional communication systems. An example of a suitable directional communication system is mmWave communication.

A group of cells 200 is shown. The cells 200 can include cells from one or more transmit receive points (TRPs). The TRPs include eNodeBs, base stations and the like.

The group of cells 200 includes a serving cell 201 and a plurality of other cells, referred to as candidate cells. The serving cell 201 is associated with one or more TRPs. The serving cell 201 is used for communications between nodes, such as a UE device and an eNodeB. However, the communications is to switch or handover from the serving cell 201 to another cell. The reasons, referred to as handover reasons, for no longer using the serving cell 201 can be reduced data rate, blockage, an outage and the like.

The candidate cells are analyzed by one or more nodes based on several objectives or metrics. An alternate cell 202 is selected or chosen based on these objectives. The objectives include mitigating outage probability, enhancing rate available, enhancing average rate, mitigating outage given an associated rate exceeding a rate threshold and enhancing a rate given an associated outage probability below an outage threshold.

A cell handover is performed from the serving cell 201 to the alternate cell 202, where the alternate cell is used as a new or current serving cell.

Figure 3:
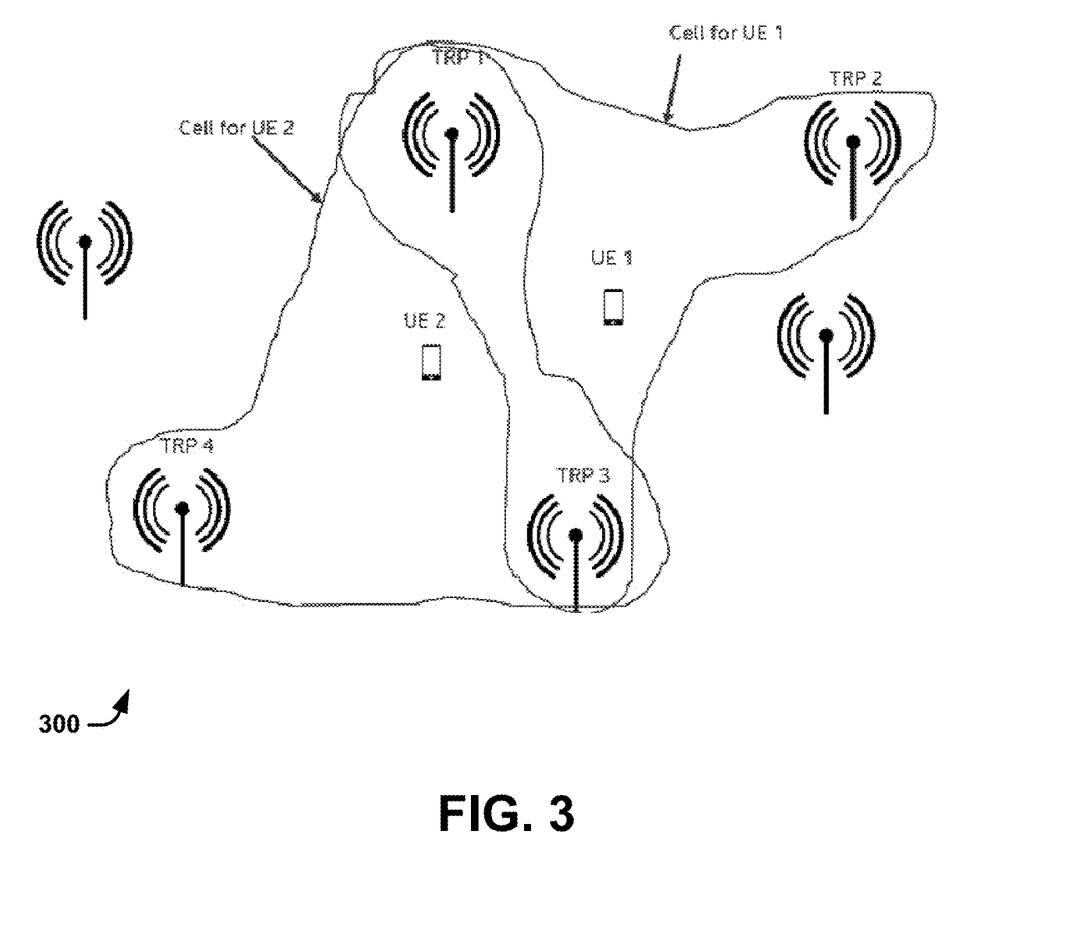
FIG. 3 is a diagram illustrating an example cell arrangement of cell formation with multiple TRPs for directional communication systems.

FIG. 3 is a diagram illustrating an example cell arrangement 300 of cell formation with multiple TRPs for directional communication systems.

The arrangement 300 includes a plurality of TRPs and a plurality of UE devices. The plurality of TRPs include TRP 1, TRP 2, TRP 3 and TRP 4. The plurality of UE devices include UE 1 and UE 2.

In this example, a first cell or serving cell for the UE 1 includes TRP 1, TRP 2, and TRP 3.

A second cell or serving cell for the UE 2 includes the TRP 1, TRP 3 and TRP 4.

As shown in the example, cells and/or candidate cells can include a plurality of TRPs and/or share TRPs with other cells.

It can also be seen that blocking or blockage that impacts the first cell can lead to a different blockage or blockage probability for the second cell. For example, a blockage of beams between the UE 2 and the TRP 4 do not substantially impact beams between the UE 1 and the TRP 2.

It is noted that the arrangement 300 is provided for illustrative purposes and that variations and other arrangements of TRPs and cells are contemplated.

Figure 4A:
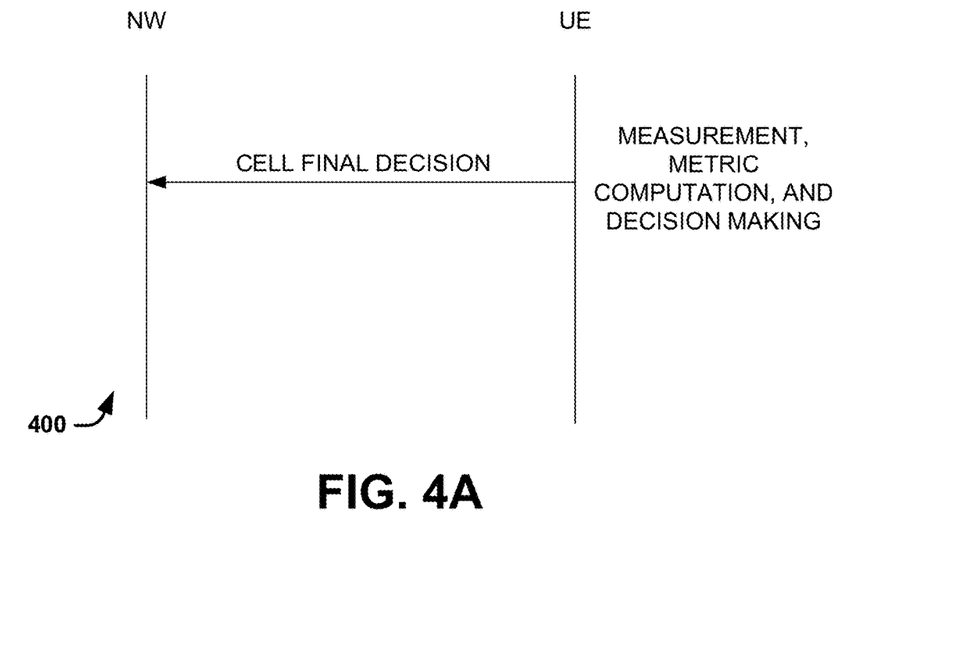
FIG. 4A is a diagram illustrating a UE controlled technique for cell related activities in accordance with an embodiment.

FIG. 4A is a diagram illustrating a UE controlled technique 400 for cell related activities in accordance with an embodiment. The technique 400 includes obtaining measurements, metric computation and cell decision making by one or more nodes. The one or more nodes can include UE devices, eNodeBs, BS and the like. The term network refers to one or more nodes or network nodes that operate inside an operator's network.

In this example, a UE device and a network are utilizing or will utilize a cell, after selection for communication. The UE device, in this example, controls measurement, metric computation and decision making.

Thus, the UE device is configured to obtain metric related measurements. These can include signal strength measurements for a plurality of beam pairs for a plurality of candidate cells.

The UE device is configured to compute one or more metrics based on the obtained metric related measurements.

The UE device is configured to perform decision making to select a serving cell from the plurality of candidate cells. The decision making includes selection of a cell or alternative cell to act as the serving cell. Once selected, the UE device signals the network with a cell final decision. The cell final decision includes the selected serving cell. The cell final decision can include other related information, such as the metric related measurements, the one or more calculated metrics and the like.

Figure 4B:
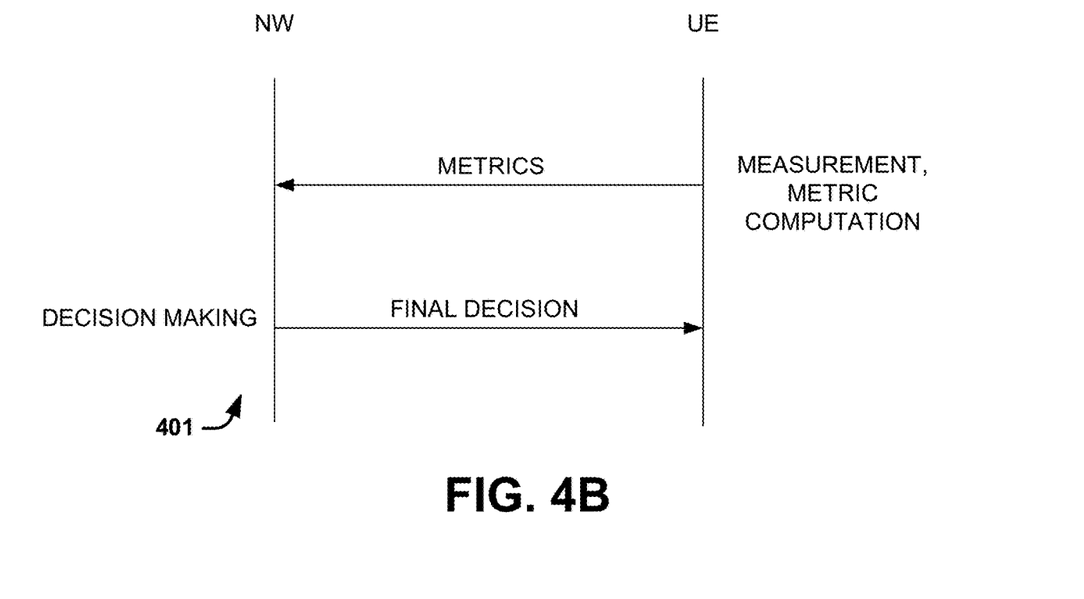
FIG. 4B is a diagram illustrating a hybrid technique for cell related activities in accordance with an embodiment.

FIG. 4B is a diagram illustrating a hybrid technique 401 for cell related activities in accordance with an embodiment. The technique 401 includes obtaining measurements, metric computation and cell decision making by one or more nodes. The one or more nodes can include UE devices, eNodeBs, BS and the like. The term network refers to one or more nodes or network nodes that operate inside an operator's network.

In this example, a UE device and a network are utilizing or will utilize a cell, after selection for communication. Both of the UE device and the network, in this example, are involved in and/or control measurement, metric computation and decision making.

In this example, the UE device is configured to obtain metric related measurements. These can include signal strength measurements for a plurality of beam pairs for a plurality of candidate cells. The UE device then calculates one or more metrics based on the obtained metric related measurements. The UE device then sends or transmits the one or more calculated metrics to the network. The UE device can use a current serving cell and/or other mechanism to send the one or more metrics.

The network receives the one or more calculated metrics. The network is configured to perform decision making to select a serving cell from the plurality of candidate cells based on the one or more calculated metrics.

Once selected, the network signals and/or messages the UE device with a cell final decision. The cell final decision includes the selected serving cell. The cell final decision can include other related information, such as the metric related measurements, the one or more calculated metrics and the like.

Figure 4C:
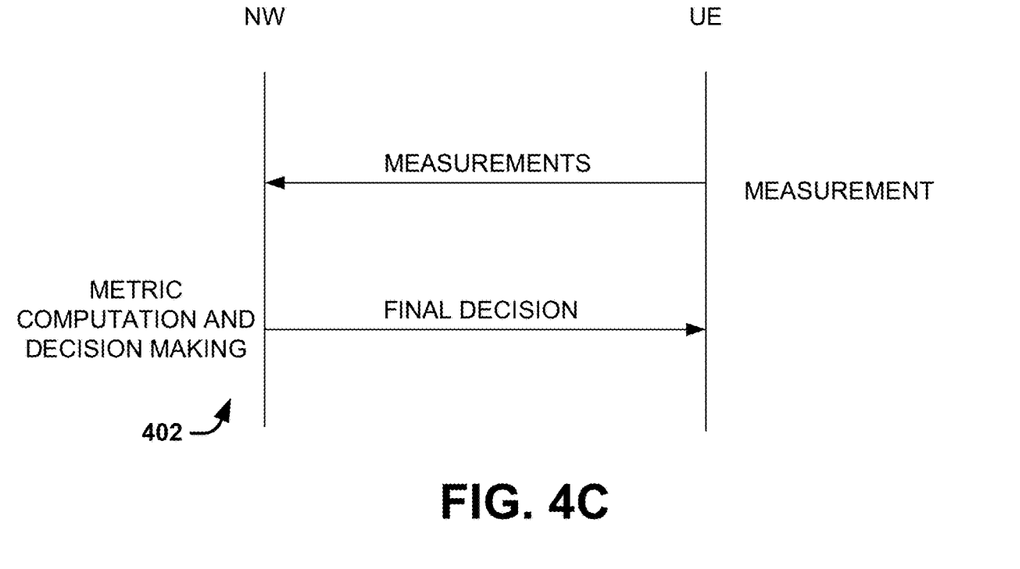
FIG. 4C is a diagram illustrating a network controlled technique for cell related activities in accordance with an embodiment.

FIG. 4C is a diagram illustrating a network controlled technique 402 for cell related activities in accordance with an embodiment. The technique 402 includes obtaining measurements, metric computation and cell decision making by one or more nodes. The one or more nodes can include UE devices, eNodeBs, BS and the like. The term network refers to one or more nodes or network nodes that operate inside an operator's network.

In this example, a UE device and a network are utilizing or will utilize a cell, after selection for communication. Both of the UE device and the network, in this example, are involved in and/or control measurement, metric computation and decision making. However, the technique is primarily or substantially controlled by the network.

In this example, the UE device is configured to obtain metric related measurements. These can include signal strength measurements for a plurality of beam pairs for a plurality of candidate cells. The UE device then sends or transmits the obtained metric related measurements. The UE device can use a current serving cell and/or other mechanism to send the one or more metrics.

The network receives the obtained metric related measurements. Then, the network is configured to calculate one or more metrics based on the obtained metric related measurements. The network is also configured to perform decision making to select a serving cell from the plurality of candidate cells based on the one or more calculated metrics.

Once selected, the network signals and/or messages the UE device with a cell final decision. The cell final decision includes the selected serving cell. The cell final decision can include other related information, such as the metric related measurements, the one or more calculated metrics and the like.

It is appreciated that the techniques and approaches shown above for cell related activities are exemplary and variations are contemplated.

Figure 5:
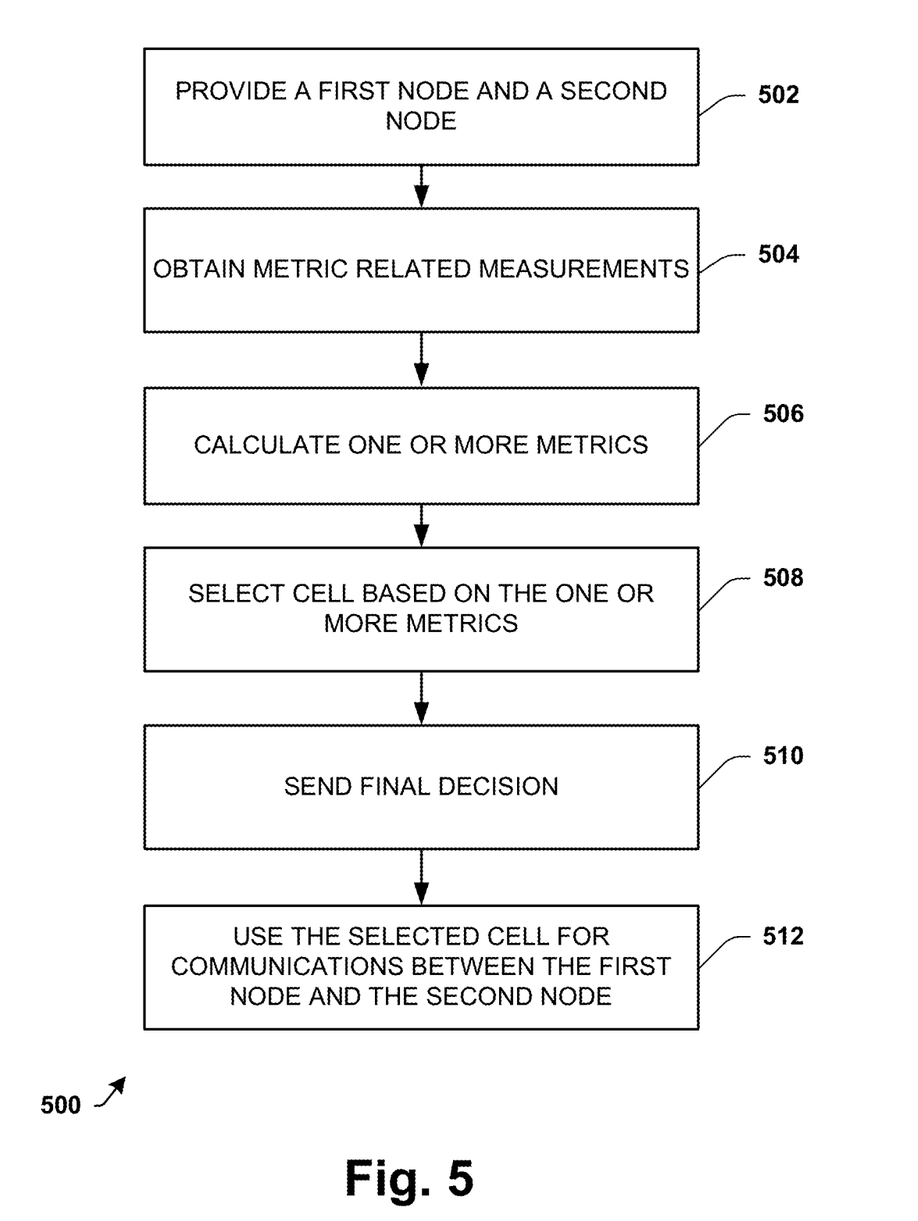
FIG. 5 is a flow diagram illustrating a method of operating one or more nodes that utilizes one or more metrics for cell related activities associated with directional communication.

FIG. 5 is a flow diagram illustrating a method 500 of operating one or more nodes that utilizes one or more metrics for cell related activities associated with directional communication. The cell related activities include cell association, cell formation and cell handover based on one or more metrics that include cell outage probability for candidate cells. The outage probability, in one example, is associated with mmWave communications, a type of directional communication.

The method 500 can be understood and utilized with reference to the arrangement 100 and variations thereof, described above.

A first node and a second node are provided for mobile communications at block 502. The first node and second node are each a type of node including, but not limited to, a UE device, eNodeB, AP, BS, and the like. The first node and/or the second node can also be a network/network node, which refers to one or more nodes or network nodes that operate inside an operator's network.

The first node obtains metric related measurements for a plurality of candidate cells at block 504. The measurements include measurements for a plurality of beam pairs for a plurality of transmit receive points (TRPs) associated with the plurality of candidate cells. The measurements can include beam signal strength and additional measurements. For cell formation, the measurements include measurements for a plurality of beam pairs associated with one or more TRPs.

The first node calculates one or more metrics based on the metric related measurements at block 506. The one or more metrics can include a strength based metric, such as signal strength. The one or more metrics include additional metrics. The additional metrics can include an outage probability metric, which indicates an outage probability for an associated candidate cell. The additional metrics can also include a rate based metric, such as peak rate, minimum rate, average data rate and the like. The additional metrics include mitigating outage probability, facilitating rate available from a selected cell, facilitating an average rate for a selected cell, mitigating outage probability for a given rate that exceeds a rate threshold, and facilitating a rate for a given outage probability below an outage threshold.

The outage probability metric can be at least partially based on heuristic proxy metrics, some examples of which are shown above.

The first node selects weightings for the one or more metrics at block 508. The weightings indicate an importance for each metric. Metrics that are deemed unimportant, can be weighted low values, such as zero. Metrics that are deemed as more important, can be weighted with higher values, such as 1.

Thus, for example, the first node can select mitigating outage probability for a given rate to have a high weighting. It is appreciated other weightings and/or selections of metrics to use are contemplated.

The first node selects an alternative cell from the plurality of candidate cells based on the one or more calculated metrics at block 510. In one example, the alternative cell is the cell that has the lowest outage probability. In another example, the alternative cell is the cell that has the highest data rate, such as average or peak rate.

The first node sends or transmits a final decision at block 512. The final decision identifies the alternative cell and can include additional information, such as the metrics used, the metric related measurements and the like.

The selected alternative cell is used for cellular communications between the first node and the second node at block 514. The selected cell can be used for cell related activities including cell association, cell formation and cell handover.

The method 500 can be performed as needed, periodically and the like. In one example, the method 500 is performed upon a predicted or detected blockage of a serving cell to select the alternative cell to be used as the serving cell.

Additionally, the method 500 is described with the first node performing the various blocks. It is appreciated that the second node can also be configured to perform some or all of the various blocks. In such examples, the metric related measurements and/or the one or more calculated metrics can be transmitted from one node to the other. Examples of various approaches are shown above as the hybrid approach, the UE controlled approach and the network controlled approach.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 6:
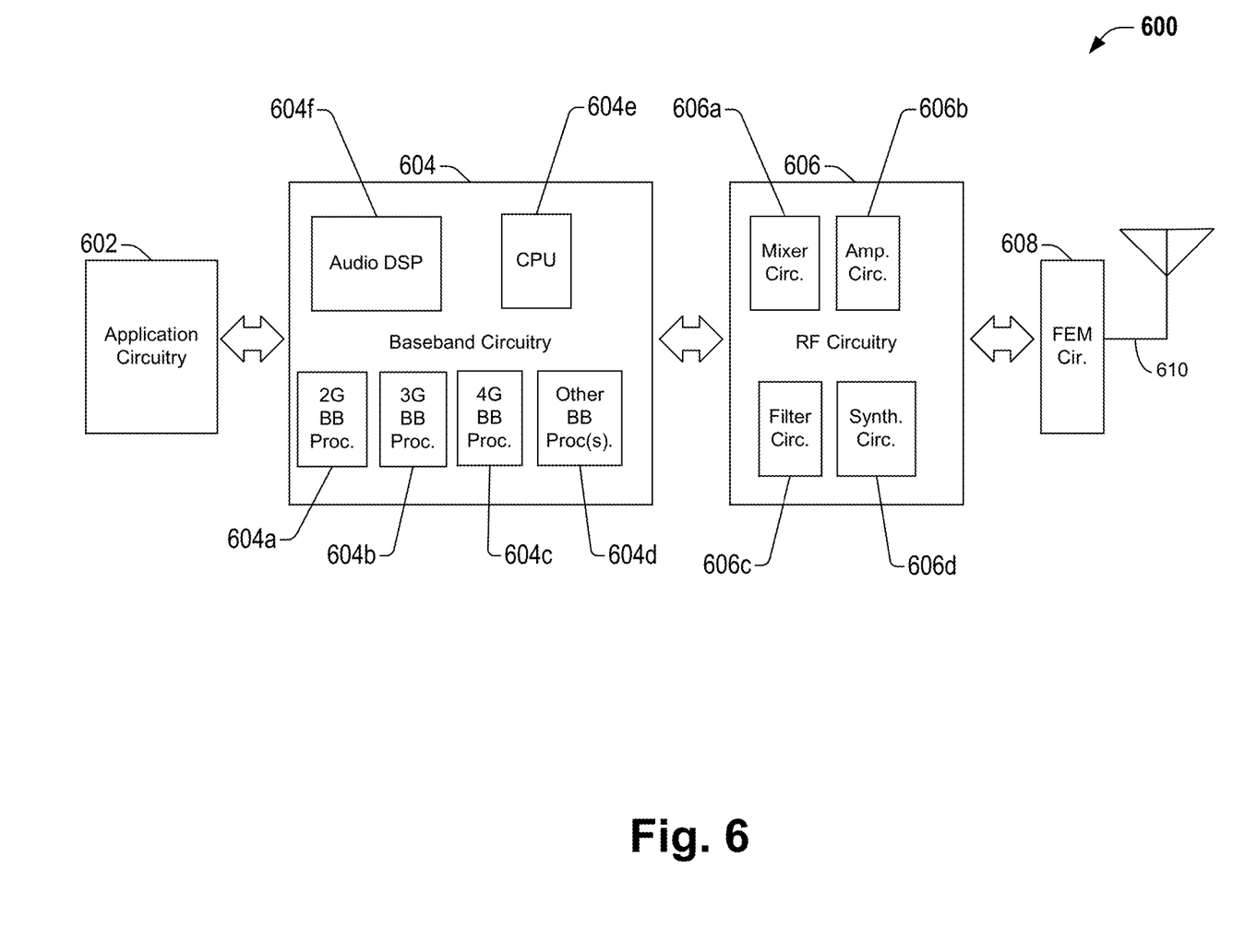
FIG. 6 illustrates example components of a User Equipment (UE) device.

Embodiments described herein can be implemented into a system using any suitably configured hardware and/or software. FIG. 6 illustrates, for one embodiment, example components of a User Equipment (UE) device 600. In some embodiments, the UE device 600 (e.g., the wireless communication device) can include application circuitry 602, baseband circuitry 604, Radio Frequency (RF) circuitry 606, front-end module (FEM) circuitry 608 and one or more antennas 610, coupled together at least as shown.

The device 600 is described as a UE device, however it is appreciated that the device and variations thereof can be utilized with other nodes or types of nodes.

The application circuitry 602 can include one or more application processors. For example, the application circuitry 602 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The baseband circuitry 604 can include circuitry such as, but not limited to, one or more single-core or multi-core processors. The baseband circuitry 604 can include one or more baseband processors and/or control logic to process baseband signals received from a receive signal path of the RF circuitry 606 and to generate baseband signals for a transmit signal path of the RF circuitry 606. Baseband processing circuitry 604 can interface with the application circuitry 602 for generation and processing of the baseband signals and for controlling operations of the RF circuitry 606. For example, in some embodiments, the baseband circuitry 604 can include a second generation (2G) baseband processor 604a, third generation (3G) baseband processor 604b, fourth generation (4G) baseband processor 604c, and/or other baseband processor(s) 604d for other existing generations, generations in development or to be developed in the future (e.g., fifth generation (5G), 6G, etc.). The baseband circuitry 604 (e.g., one or more of baseband processors 604a-d) can handle various radio control functions that enable communication with one or more radio networks via the RF circuitry 606. The radio control functions can include, but are not limited to, signal modulation/demodulation, encoding/decoding, radio frequency shifting, etc. In some embodiments, modulation/demodulation circuitry of the baseband circuitry 604 can include Fast-Fourier Transform (FFT), precoding, and/or constellation mapping/demapping functionality. In some embodiments, encoding/decoding circuitry of the baseband circuitry 604 can include convolution, tail-biting convolution, turbo, Viterbi, and/or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 604 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 604e of the baseband circuitry 604 can be configured to run elements of the protocol stack for signaling of the PHY, MAC, RLC, PDCP and/or RRC layers. In some embodiments, the baseband circuitry can include one or more audio digital signal processor(s) (DSP) 604f. The audio DSP(s) 604f can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 604 and the application circuitry 602 can be implemented together such as, for example, on a system on a chip (SOC).

In some embodiments, the baseband circuitry 604 can provide for communication compatible with one or more radio technologies. For example, in some embodiments, the baseband circuitry 604 can support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 604 is configured to support radio communications of more than one wireless protocol can be referred to as multi-mode baseband circuitry.

RF circuitry 606 can enable communication with wireless networks using modulated electromagnetic radiation through a non-solid medium. In various embodiments, the RF circuitry 606 can include switches, filters, amplifiers, etc. to facilitate the communication with the wireless network. RF circuitry 606 can include a receive signal path which can include circuitry to down-convert RF signals received from the FEM circuitry 608 and provide baseband signals to the baseband circuitry 604. RF circuitry 606 can also include a transmit signal path which can include circuitry to up-convert baseband signals provided by the baseband circuitry 604 and provide RF output signals to the FEM circuitry 608 for transmission.

In some embodiments, the RF circuitry 606 can include a receive signal path and a transmit signal path. The receive signal path of the RF circuitry 606 can include mixer circuitry 606a, amplifier circuitry 606b and filter circuitry 606c. The transmit signal path of the RF circuitry 606 can include filter circuitry 606c and mixer circuitry 606a. RF circuitry 606 can also include synthesizer circuitry 606d for synthesizing a frequency for use by the mixer circuitry 606a of the receive signal path and the transmit signal path. In some embodiments, the mixer circuitry 606a of the receive signal path can be configured to down-convert RF signals received from the FEM circuitry 608 based on the synthesized frequency provided by synthesizer circuitry 606d. The amplifier circuitry 606b can be configured to amplify the down-converted signals and the filter circuitry 606c can be a low-pass filter (LPF) or band-pass filter (BPF) configured to remove unwanted signals from the down-converted signals to generate output baseband signals. Output baseband signals can be provided to the baseband circuitry 604 for further processing. In some embodiments, the output baseband signals can be zero-frequency baseband signals, although this is not a requirement. In some embodiments, mixer circuitry 606a of the receive signal path can comprise passive mixers, although the scope of the embodiments is not limited in this respect.

In some embodiments, the mixer circuitry 606a of the transmit signal path can be configured to up-convert input baseband signals based on the synthesized frequency provided by the synthesizer circuitry 606d to generate RF output signals for the FEM circuitry 608. The baseband signals can be provided by the baseband circuitry 604 and can be filtered by filter circuitry 606c. The filter circuitry 606c can include a low-pass filter (LPF), although the scope of the embodiments is not limited in this respect.

In some embodiments, the mixer circuitry 606a of the receive signal path and the mixer circuitry 606a of the transmit signal path can include two or more mixers and can be arranged for quadrature downconversion and/or upconversion respectively. In some embodiments, the mixer circuitry 606a of the receive signal path and the mixer circuitry 606a of the transmit signal path can include two or more mixers and can be arranged for image rejection (e.g., Hartley image rejection). In some embodiments, the mixer circuitry 606a of the receive signal path and the mixer circuitry 606a can be arranged for direct downconversion and/or direct upconversion, respectively. In some embodiments, the mixer circuitry 606a of the receive signal path and the mixer circuitry 606a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 606 can include analog-to-digital converter (ADC) and digital-to-analog converter (DAC) circuitry and the baseband circuitry 604 can include a digital baseband interface to communicate with the RF circuitry 606.

In some dual-mode embodiments, a separate radio IC circuitry can be provided for processing signals for each spectrum, although the scope of the embodiments is not limited in this respect.

In some embodiments, the synthesizer circuitry 606d can be a fractional-N synthesizer or a fractional N/N+8 synthesizer, although the scope of the embodiments is not limited in this respect as other types of frequency synthesizers can be suitable. For example, synthesizer circuitry 606d can be a delta-sigma synthesizer, a frequency multiplier, or a synthesizer comprising a phase-locked loop with a frequency divider.

The synthesizer circuitry 606d can be configured to synthesize an output frequency for use by the mixer circuitry 606a of the RF circuitry 606 based on a frequency input and a divider control input. In some embodiments, the synthesizer circuitry 606d can be a fractional N/N+8 synthesizer.

In some embodiments, frequency input can be provided by a voltage controlled oscillator (VCO), although that is not a requirement. Divider control input can be provided by either the baseband circuitry 604 or the applications processor 602 depending on the desired output frequency. In some embodiments, a divider control input (e.g., N) can be determined from a look-up table based on a channel indicated by the applications processor 602.

Synthesizer circuitry 606d of the RF circuitry 606 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+8 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fro). In some embodiments, the RF circuitry 606 can include an IQ/polar converter.

FEM circuitry 608 can include a receive signal path which can include circuitry configured to operate on RF signals received from one or more antennas 680, amplify the received signals and provide the amplified versions of the received signals to the RF circuitry 606 for further processing. FEM circuitry 608 can also include a transmit signal path which can include circuitry configured to amplify signals for transmission provided by the RF circuitry 606 for transmission by one or more of the one or more antennas 610.

In some embodiments, the FEM circuitry 608 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 606). The transmit signal path of the FEM circuitry 608 can include a power amplifier (PA) to amplify input RF signals (e.g., provided by RF circuitry 606), and one or more filters to generate RF signals for subsequent transmission (e.g., by one or more of the one or more antennas 680.

In some embodiments, the UE device 600 can include additional elements such as, for example, memory/storage, display, camera, sensor, and/or input/output (I/O) interface.

It is appreciated that the described application circuitry 602, baseband circuitry 604, Radio Frequency (RF) circuitry 606, front-end module (FEM) circuitry 608 and one or more antennas 610 can also be utilized with an evolved Node B (eNodeB).

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is an apparatus configured to be employed within one or more nodes. The apparatus includes control circuitry and a transceiver. The control circuitry is configured to obtain metric related measurements for a plurality of candidate cells; calculate one or more metrics for the plurality of candidate cells based on the obtained metric related measurements, wherein the one or more metrics include an outage probability metric; and select an alternative cell of the plurality candidate cell based on the one or more calculated metrics.

Example 2 includes the subject matter of Example 1, including or omitting optional elements, where the control circuitry is configured to obtain the metric related measurements upon a blockage of a serving cell.

Example 3 includes the subject matter of any of Examples 1-2, including or omitting optional elements, where the alternative cell comprises a plurality of transmit receive points (TRP).

Example 4 includes the subject matter of any of Examples 1-3, including or omitting optional elements, where the one or more nodes is a user equipment (UE) device.

Example 5 includes the subject matter of any of Examples 1-4, including or omitting optional elements, where the one or more nodes is a network node.

Example 6 includes the subject matter of any of Examples 1-5, including or omitting optional elements, where the apparatus includes a transceiver configured to transmit the metric related measurements a final decision, wherein the final decision includes the selected alternative cell.

Example 7 includes the subject matter of any of Examples 1-6, including or omitting optional elements, where the apparatus further comprises a transceiver configured to transmit the one or more calculated metrics.

Example 8 includes the subject matter of any of Examples 1-7, including or omitting optional elements, where the control circuitry is configured to calculate an outage probability for each cell of the plurality of candidate cells.

Example 9 includes the subject matter of any of Examples 1-8, including or omitting optional elements, where the metric related measurements include beam measurements associated with each of the plurality of candidate cells.

Example 10 includes the subject matter of any of Examples 1-9, including or omitting optional elements, where the metric related measurements include a reference signal received power (RSRP) for beam pairs associated with the plurality of candidate cells.

Example 11 includes the subject matter of any of Examples 1-10, including or omitting optional elements, where the control circuitry is configured to utilize proxy metrics to calculate the one or more metrics, wherein the proxy metrics include one or more of a pairwise circle distance, an average pairwise circle distance and a great circle distance.

Example 12 includes the subject matter of any of Examples 1-11, including or omitting optional elements, where the outage probability metric is proportional to the KPIs.

Example 13 is a system for cell related activities using directional communication. The system is for cell related activities using directional communication. The system includes a network node and a user equipment (UE) device. A first node of the network node and the UE device is configured to obtain metric related measurements associated with an outage probability metric.

Example 14 includes the subject matter of Example 13, including or omitting optional elements, where the first node is configured to calculate one or more metrics based on the obtained metric related measurements and to select a cell based on the one or more calculated metrics, wherein the one or more metrics include an outage probability metric.

Example 15 includes the subject matter of any of Examples 13-14, including or omitting optional elements, where a second node of the network node and the UE device is configured to select a cell based on one or more calculated metrics based on the obtained metric related measurements.

Example 16 includes the subject matter of any of Examples 13-15, including or omitting optional elements, where a second node of the network node and the UE device is configured to calculate one or more metrics based on the obtained metric related measurements, select a cell based on the one or more calculated metrics and transmit a final decision to the first node, wherein the final decision identifies the selected cell.

Example 17 includes the subject matter of any of Examples 13-16, including or omitting optional elements, where the metric related measurements include proxy metrics.

Example 18 is one or more computer-readable media having instructions that, when executed, cause one or more nodes to obtain metric related measurements for a directional communication system and calculate one or more metrics based on the obtained metric related measurements. The one or more metrics include an outage probability metric.

Example 19 includes the subject matter of Example 18, including or omitting optional elements, comprising one or more computer-readable media having instructions that, when executed, further cause the one or more nodes to select a cell from a plurality of candidate cells based on the one or more calculated metrics.

Example 20 includes the subject matter of any of Examples 18-19, including or omitting optional elements, comprising one or more computer-readable media having instructions that, when executed, further cause the one or more nodes to establish directional communications between a first node and a second node of the one or more nodes using the selected cell as a serving cell.

Example 21 is an apparatus to be employed within one or more nodes. The apparatus comprises a means to obtain metric related measurements, wherein the metric related measurements include key performance indicators (KPIs); a means to calculate one or more metrics based on the obtained metric related measurements; and a means to select or identify a cell based on the one or more calculated metrics.

Example 22 is an apparatus configured to be employed within a user equipment (UE) device. The apparatus comprises baseband circuitry and radio frequency (RF) circuitry. The baseband circuitry is configured perform measurements to obtain metric related measurements for a plurality of candidate cells and calculate one or more metrics for the plurality of candidate cells based on the obtained metric related measurements, wherein the one or more metrics include an outage probability metric. The RF circuitry is configured to communicate the calculated one or more metrics.

Example 23 includes the subject matter of Example 22, including or omitting optional elements, wherein the RF circuitry is configured to receive a final decision from a network node, wherein the final decision identifies a selected cell of the plurality of candidate cells.

Example 24 includes the subject matter of any of Examples 22-23, including or omitting optional elements, wherein the baseband circuitry is further configured to provide communication using the selected cell.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. An apparatus comprising:
   control circuitry configured to:
   upon a blockage of a serving cell, obtain metric related measurements for a plurality of candidate cells;
   calculate one or more metrics for the plurality of candidate cells based on the obtained metric related measurements, wherein the one or more metrics include an outage probability metric;
   wherein the outage probability metric is a function of an angular difference between two or more beams from the plurality of candidate cells, and the outage probability metric is inversely proportional to a reference signal received power (RSRP) and inversely proportional to a pairwise great circle distance of beam pairs from the plurality of candidate cells; and
   select an alternative cell of the plurality of candidate cells based on the one or more calculated metrics; and
   a transceiver configured to transmit a final decision, wherein the final decision includes the selected alternative cell.

2. The apparatus of claim 1, wherein the alternative cell comprises a plurality of transmit receive points (TRP).

3. The apparatus of claim 1, wherein the apparatus is configured to be employed within one or more user equipment (UE) devices.

4. The apparatus of claim 1, wherein the apparatus is configured to be employed within one or more network nodes.

5. The apparatus of claim 1, wherein the transceiver is configured to transmit the metric related measurements.

6. The apparatus of claim 1, wherein the transceiver is configured to transmit the one or more calculated metrics.

7. The apparatus of claim 1, wherein the control circuitry is configured to calculate the outage probability metric for each cell of the plurality of candidate cells.

8. The apparatus of claim 1, wherein the metric related measurements include beam measurements associated with each of the plurality of candidate cells.

9. The apparatus of claim 1, wherein the control circuitry is configured to utilize proxy metrics to calculate the one or more metrics, wherein the proxy metrics include one or more of a pairwise circle distance, an average pairwise circle distance and a great circle distance.

10. A system for cell related activities using directional communication, the system comprising:
    a network node;
    a user equipment (UE) device coupled to the network node;
    wherein a first node of the network node and the UE device is configured to obtain metric related measurements associated with an outage probability metric; and
    wherein the outage probability metric is a function of an angular difference between two or more cells, and the outage probability metric is inversely proportional to a reference signal received power (RSRP) and inversely proportional to a pairwise great circle distance of beam pairs from the two or more cells.

11. The system of claim 10, wherein the first node is configured to calculate one or more metrics based on the obtained metric related measurements and to select a cell based on the one or more calculated metrics, wherein the one or more metrics include the outage probability metric.

12. The system of claim 10, wherein a second node of the network node and the UE device is configured to select a cell based on one or more calculated metrics based on the obtained metric related measurements.

13. The system of claim 10, wherein a second node of the network node and the UE device is configured to calculate one or more metrics based on the obtained metric related measurements, select a cell based on the one or more calculated metrics and transmit a final decision to the first node, wherein the final decision identifies the selected cell.

14. The system of claim 10, wherein the metric related measurements include proxy metrics.

15. One or more non-transitory computer-readable media having instructions that, when executed, cause one or more nodes to:
    obtain metric related measurements for a directional communication system;
    calculate one or more metrics including an outage probability metric based on the obtained metric related measurements;
    wherein the outage probability metric is a function of an angular difference between two or more beams from the directional communications system, and the outage probability metric is inversely proportional to a reference signal received power (RSRP) and inversely proportional to pairwise great circle distance of beam pairs from the directional communication system;
    select an alternative cell from a plurality of candidate cells based on the one or more calculated metrics; and
    transmit a final decision, wherein the final decision includes the selected alternative cell and a cell handover from a serving cell to the selected alternative cell takes place as a result of the final decision.

16. The one or more non-transitory computer-readable media of claim 15, comprising one or more computer-readable media having instructions that, when executed, further cause the one or more nodes to:
    establish directional communications between a first node and a second node of the one or more nodes using a selected cell as the serving cell.

* * * * *